United States Patent

Kronenberg et al.

[11] Patent Number: 4,635,043
[45] Date of Patent: Jan. 6, 1987

[54] LEVEL INDICATION

[75] Inventors: Harmut Kronenberg, Schwalbach; Bernhard v. Pentz, Kronberg, both of Fed. Rep. of Germany

[73] Assignee: VDO Adolf Schindling AG, Frankfurt am Main, Fed. Rep. of Germany

[21] Appl. No.: 747,543

[22] Filed: Jun. 21, 1985

[30] Foreign Application Priority Data

Jul. 9, 1984 [DE] Fed. Rep. of Germany ....... 3425212

[51] Int. Cl.⁴ ............................................. G08B 21/00
[52] U.S. Cl. ..................... 340/618; 73/313; 324/99 D; 324/140 D; 340/59
[58] Field of Search ............... 340/618, 59; 73/308, 73/313, 430; 324/99 D, 111, 120, 140 D, 125

[56] References Cited
U.S. PATENT DOCUMENTS 3,316,547  4/1967  Ammann .................. 324/99 D
3,502,983  3/1970  Ingle et al. ............... 324/140 D
3,999,123  12/1976  Thoener ................... 324/99 D
4,087,796  5/1978  Brown ..................... 324/99 D X
4,254,406  3/1981  Meares .................... 324/99 D X Primary Examiner—James L. Rowland
Assistant Examiner—Daniel Myer
Attorney, Agent, or Firm—Martin A. Farber

[57] ABSTRACT

A level indication has a ratio-measurement mechanism whose measurement coil can be connected to a source of current (6) via a switch element (12). This switch element (12) is controlled by the output of a comparator (10) to the input side of which a voltage signal from a transmitter (5) monitoring the level and the output of a frequency transmitter (11) are fed. Between the transmitter (5) and the comparator (10) there is arranged a damping device (8) so that the signal coming from the transmitter (5) is made stable before it arrives at the comparator (10).

10 Claims, 1 Drawing Figure

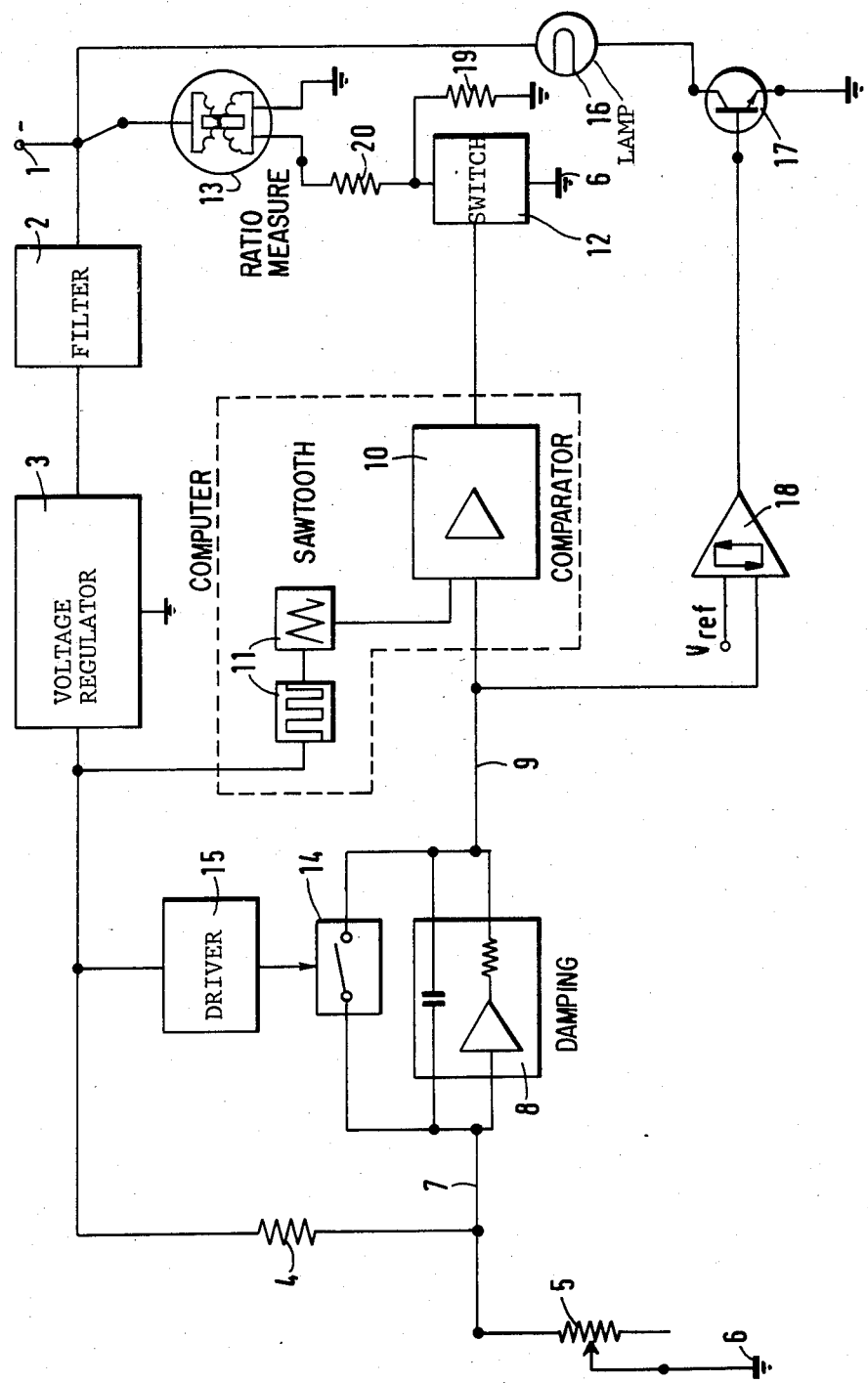

LEVEL INDICATION

FIELD AND BACKGROUND OF THE INVENTION

The invention refers to a level indication having a transmitter whose electrical resistance is variable as a function of the level and which has an electric measuring mechanism.

Such level indications are used, for example, in automotive vehicles in order to indicate the amount of fuel in the tank and are generally known.

In automotive vehicles the problem exists in connection with level indications that the level may change temporarily very rapidly as a result of vibrations during travel or forces of acceleration upon traveling around a curve or changes in the speed of the vehicle. If the level indications are not sufficiently damped, the pointer then moves correspondingly rapidly back and forth, which makes an exact indication of the level impossible.

Oil damping has been provided, it is true, in ratio measurement mechanism which respond very rapidly to changes in current. There is the disadvantage here, however, that the oil changes its viscosity greatly upon changes in temperature and therefore dampens to different extents, so that erroneous measured values also result.

It is an object of the present invention to develop a level indication of the aforementioned type in such a manner that a damping of the indication which is independent of the temperature is possible, without detrimental effect on the precision of the indication, at the smallest possible expense.

SUMMARY OF THE INVENTION

According to the invention, the measurement mechanism is a ratio measurement mechanism (13) whose one measurement coil can be connected via an electric system having a damping device (8) to a source of voltage (7) as a function of a transmitter signal with variable on-off ratio.

In the level indication of the invention, the measurement coil is not directly controlled by the transmitter but, rather, with interposition of the electronic system. By the change in the on/off ratio a greater or lesser amount of current on the average flows through the measurement coil so that there is a corresponding deflection of the pointer, exactly as in the previously known level indication. Differing from the previously known measurement mechanisms, the ratio measurement mechanism, however, need not be damped by mechanical means. As a result, the accuracy of the indication is increased. By varying the electronic damping, adaptation to the conditions in the tank whose level is to be measured is furthermore possible.

The level indication of the invention can be most easily developed with electronic components if the pulse-pause ratio is formed digitally by a microprocessor which, for instance, can also control further indications as onboard computer.

In order to produce the pulses which control the measurement coil, there is advantageously employed a comparator (10) which is connected on its input side to the resistance signal of the transmitter (5) and a constant sawtooth frequency.

The damping device (8) is preferably an RC circuit with a high-ohmic amplifier connected behind it, for instance an operational amplifier.

It is desirable in automobiles that an indication of the level be available immediately upon the turning on of the ignition. The electronic damping in accordance with the invention, however, in itself, prevents the desired rapid indication. However, this can be avoided if the damping device (8) can be bridged by a bypass switch (14) which closes for a short time at the moment that the level indication is turned on.

The level indication of the invention can also contain a warning light which lights up when a minimum level is reached. In one such embodiment a connection is made between the damping device (8) and the comparator (10) to a threshold switch (18) via which the warning light (16) is switched to indicate a reserve level.

Switch element (12) which is arranged between the source of current (6) and the ratio measurement mechanism (13) and by which the ratio measurement mechanism (13) can be connected to the source of current (6) is preferably adapted to be controlled by the output signal of the comparator (10).

Adaptation of the beginning and end of the indicating range of the ratio measurement mechanism is possible in the manner that a resistor (19) is connected in parallel to the switch element (12). The same purpose is served if a resistor (20) is arranged between the switch element (12) and the ratio measurement mechanism (13).

The invention permits of numerous embodiments.

BRIEF DESCRIPTION OF THE DRAWING

In order to explain the basic principle of the invention, the sole FIGURE of the drawing is a block diagram of the level indication of the invention, which will be described below.

DETAILED DESCRIPTION OF THE PREFERRED EMBODIMENT

The level indication of the invention is provided with direct current via a terminal 1 from a source of voltage, not shown. A filter 2 serves to stabilize the voltage supply and to filter out superimposed disturbing signals. Current flows through a series resistor 4 and a transmitter 5 to the vehicle ground 6. The transmitter 5 can be a resistance which varies in accordance with the level in the tank.

A level-dependent voltage is fed via a line 7 to an electronic damping device 8, which is an integrator circuit with suitable time constant, which transforms voltage surges at the input voltage divider formed of series resistor 4 and transmitter 5 into a slow change in voltage at its output. This calmed transmitter signal is fed, via a line 9, to a comparator 10 which furthermore receives a sawtooth voltage on its input side via a frequency transmitter 11.

Pulses whose pulse widths are modulated as a function of the voltage coming from the transmitter 5 are then produced at the output of the comparator 10. These pulses are fed to a switch element 12 which switches upon the application of each pulse and thereby connects the ratio measurement mechanism 13 in pulsating fashion with the ground of the car.

In order to be able to display a correct measurement value immediately, without delay, upon the turning on of the ignition, the damping device 8 has a bypass switch 14 with an electronic driver 15 which is controlled by the terminal 1 and includes a well-known timer (not shown) to provide for a switch closure temporarily at the instant of the turning on of the ignition, thereby making the damping 8 inactive.

It is desirable, in particular in automotive vehicles, that when a minimum fuel level is reached a warning light 16 light up. This light is also connected to the terminal 1 and furthermore to ground via a transistor 17. The transistor conducts when the voltage in the line 9 drops below a value which is fixed in a threshold switch 18.

A voltage regulator 3 may be coupled between the filter 2 and the resistor 4 to insure greater accuracy to the voltage appearing on line 7.

We claim:

1. In a liquid level indicator having a transmitter whose electrical resistance is variable as a function of the level for providing a signal voltage, the indicator including an electric measurement mechanism, the improvement comprising an electronic pulse-width modulation system with a damping device, said damping being connected to said transmitter for damping said signal voltage, and wherein the mesurement mechanism is a ratio measurement mechanism having a first and a second coil, said first coil being connected via said system and said damping device to the signal voltage, said second coil being connected to a reference voltage, said electronic system including modulation means serially connected between said damping device and said first coil for pulsing the signal voltage to provide a pulse-width modulation with a variable duty ratio dependent on the magnitude of said signal voltage.

2. The liquid level indicator according to claim 1, wherein said modulation means comprises:

pulsing means coupled to said first coil for pulsing current thereto; and a microprocessor for driving said pulsing means, said microprocessor being responsive to said signal voltage for digital formation of the duty ratio.

3. The liquid level indicator according to claim 1, wherein said damping device comprises an RC circuit and a high-ohmic amplifier connected to said RC circuit.

4. The liquid level indicator according to claim 1, wherein said electronic system comprises an electronic switch connected in parallel with said damping device, said electronic switch closing momentarily upon energization of said system.

5. The liquid level indicator according to claim 1, wherein said modulation means comprises a comparator and a sawtooth signal generator coupled to a first input terminal of said comparator, said comparator outputting a signal to said first coil, said comparator being connected by a second input terminal thereof to said damping device for receiving the signal of the transmitter, said sawtooth generator outputting a constant sawtooth frequency signal to the comparator.

6. The liquid level indicator according to claim 5, further comprising a warning light and a threshold switch operatively connected thereto, said threshold switch being responsive to an output signal of said damping device to switch the warning light to indicate a reserve level.

7. The liquid level indicator according to claim 5, wherein said modulation means includes a switch element connected between a source of current and said first coil of said ratio measurement mechanism for applying current to the ratio measurement mechanism, said switch element being controlled by the output signal of said comparator.

8. The liquid level indicator according to claim 7, wherein said electronic system further comprises a resistor connected in parallel to said switch element.

9. The liquid level indicator according to claim 8, wherein said electronic system further comprises a resistor connected between said switch element and said first coil of the ratio measurement mechanism.

10. An indicator for the measurement of liquid level comprising:

a transmitter providing a signal voltage in response to the level of a liquid;

a display of the liquid level, the display comprising a ratio measurement device having a first coil and a second coil;

means coupled to said transmitter for damping said signal voltage;

a pulse width modulator coupled via said damping means to said transmitter, said modulator pulsing the signal voltage to provide a pulse width modulation with a variable duty ratio dependent on the magnitude of the signal voltage; and wherein said first coil is energized with an output pulse-width modulated signal of said modulator, and said second coil is energized with a reference signal for operating said display to show the liquid level.

* * * * *